Sept. 1, 1931. G. F. YAGER 1,821,199
MACHINE FOR MANUFACTURING BUSHINGS
Filed Sept. 18, 1929
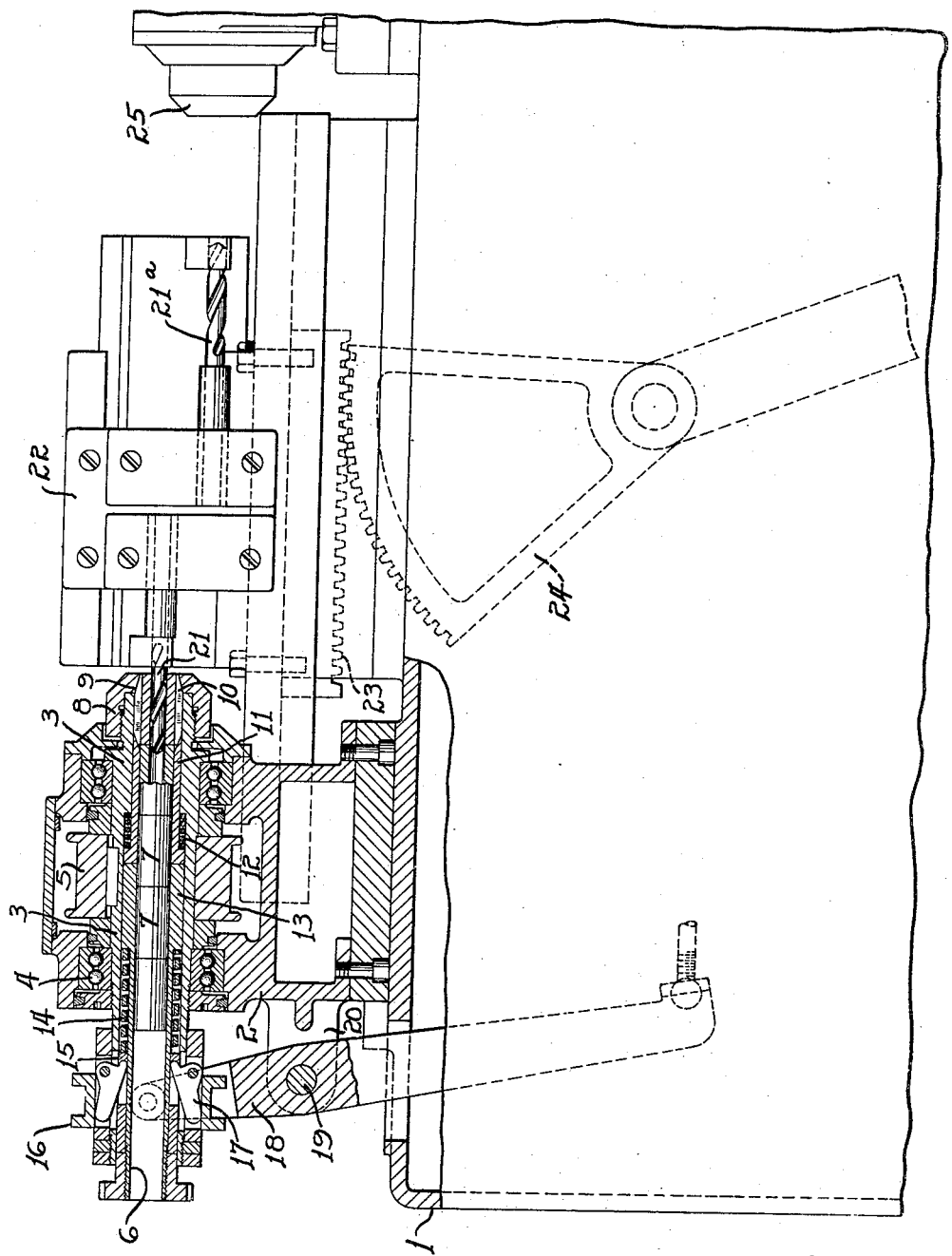
Inventor
George F. Yager
By
Owen & Owen
Attorneys Patented Sept. 1, 1931

1,821,199

UNITED STATES PATENT OFFICE

GEORGE F. YAGER, OF TOLEDO, OHIO, ASSIGNOR TO THE BUNTING BRASS & BRONZE COMPANY, OF TOLEDO, OHIO, A CORPORATION

MACHINE FOR MANUFACTURING BUSHINGS

Application filed September 18, 1929. Serial No. 393,558.

This invention relates to the manufacture of bushings, but more particularly to machines for making relatively small bushings, and an object is to provide a simple and efficient machine of this character in which the bushings are discharged after being drilled without the necessity of additional mechanism for forcing them from the machine, thereby facilitating production. Other objects will hereinafter appear.

The invention is shown by way of illustration in the accompanying drawing, in which—

The figure is a side elevation partly in vertical section of a portion of a machine for drilling slugs for the manufacture of bushings.

The illustrated embodiment of the invention comprises a machine frame 1 on which is mounted a spindle support 2 for a rotary spindle 3. The spindle 3 is supported in ball bearings 4, one set being positioned on each side of a sheave 5. The sheave 5 may be connected to any suitable source of power, for example, an electric motor.

The spindle 3 is provided with an axially extending tubular passage 6, which is open at opposite ends and is of sufficient size to accommodate slugs 7, which are adapted to be advanced step by step through the passage 6 from one end where they are drilled to the opposite end from which they are discharged from the machine. This is considered an important feature inasmuch as, in this machine it is merely necessary to deliver the slugs in any suitable manner to the drilling end of the passage 6, and no attention need be given to the discharging of the drilled slugs. It is to be understood that when a new slug is delivered to the passage 6 for drilling purposes, it forces the other slugs in the passage to the left of the figure, the slug at the extreme left of the passage being accordingly discharged from the machine.

In order to hold a slug in place in the passage or bore 6 for drilling purposes, a cap 8 is screwed onto the end of the spindle 3 and has a tapering surface 9 bearing against an inclined surface on a sectional chuck 10. The opposite end of the chuck is also beveled or inclined and is engaged by a tapered end of sleeve-like member 11, which is normally held out of operative engagement with the chuck by a coiled spring 12. Bearing against the outer end of the member 11 and disposed within the spindle 3 is a tubular member 13 having a reduced portion to receive a coiled spring 14 against which a ring 15 abuts. Slidable over the spindle 3 is a collar 16 carrying pivoted fingers 17 which bear against the ring 15. A lever 18 pivoted at 19 to a bracket 20 engages the collar 16 and is operated in any suitable manner.

In practice, movement of the lever in a clockwise manner actuates the ring 15 to the right to compress the coiled spring 14, thereby exerting a yielding pressure on the sleeve parts 13 and 12 to force or cam the chuck segments 10 into frictional binding or clamping engagement with a slug inserted into the passage 6 preparatory to drilling. It will be understood that the lever 18 operates automatically to clamp and release the slugs in timed relation to the drilling tool, as will be readily understood.

A drill 21 is mounted in axial alignment with the bore 6 on a carriage 22. The drill 21 is non-rotatable but reciprocates longitudinally, a rack 23 being provided on the lower side and a gear sector 24 engaging the rack for operation thereof. The sector 24 is operated in timed relation to the lever 18 in any suitable manner, the operation being that about the time the tool 21 engages the slug, the lever 18 operates firmly to clamp the slug in place.

It will be observed that a similar hollow spindle arrangement 25 may be provided on the opposite side of the machine, and the carriage 22 may carry a second drilling tool 21ª so that in movement of the carriage in one direction or the other a slug will be drilled. Any suitable means may be provided for feeding slugs to the spindle.

Numerous changes in details of construction, arrangement and operation may be effected without departing from the spirit of the invention.

What I claim is:

In a machine for coring slugs, a rotatable hollow spindle, a slug engaging chuck slidable in said spindle and having an axial bore, a tubular member in said spindle, spring means in the spindle for moving said member toward the chuck, a chuck actuating sleeve in the spindle abutting said tubular member so as to be operated by the latter, independent spring means in the spindle engaging the sleeve for moving the chuck to release the slug, and a longitudinally reciprocal drill axially alined with the chuck and sleeve.

In testimony whereof I have hereunto signed my name to this specification.

GEORGE F. YAGER.